R. G. ELDER.

Velocipede.

No. 99,421.

Patented Feb. 1, 1870.

WITNESSES:

INVENTOR:

United States Patent Office.

R. G. ELDER, OF NEW YORK, N. Y.

Letters Patent No. 99,421, dated February 1, 1870.

IMPROVEMENT IN FOUR-WHEEL PROPELLER.

The Schedule referred to in these Letters Patent and making part of the same

*To all whom it may concern:*

Be it known that I, R. G. ELDER, of the city, county, and State of New York, have invented a new and improved Four-Wheel Propeller; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
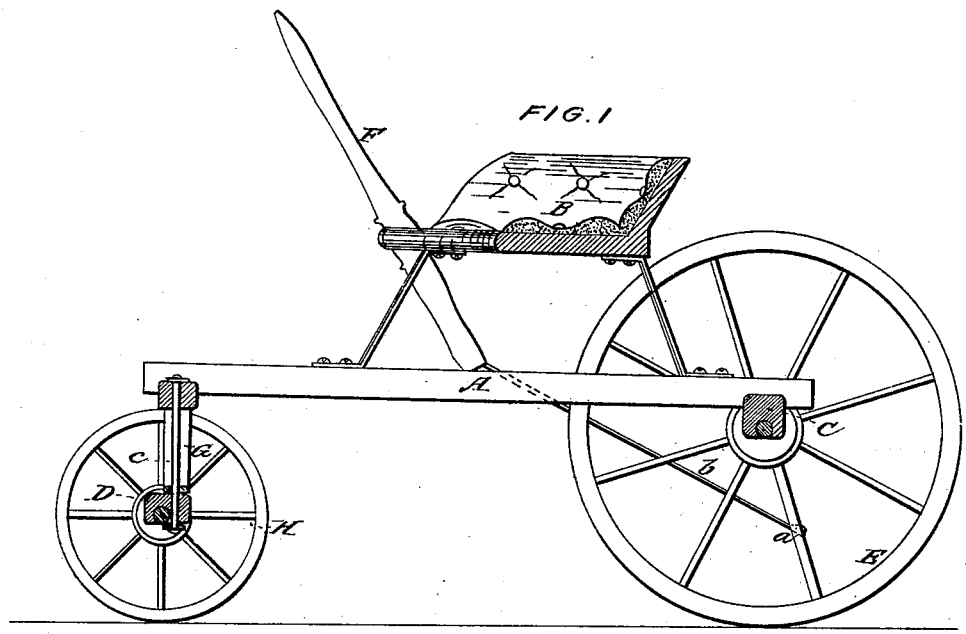
Figure 1 represents a longitudinal vertical section of this invention.
Figure 2:
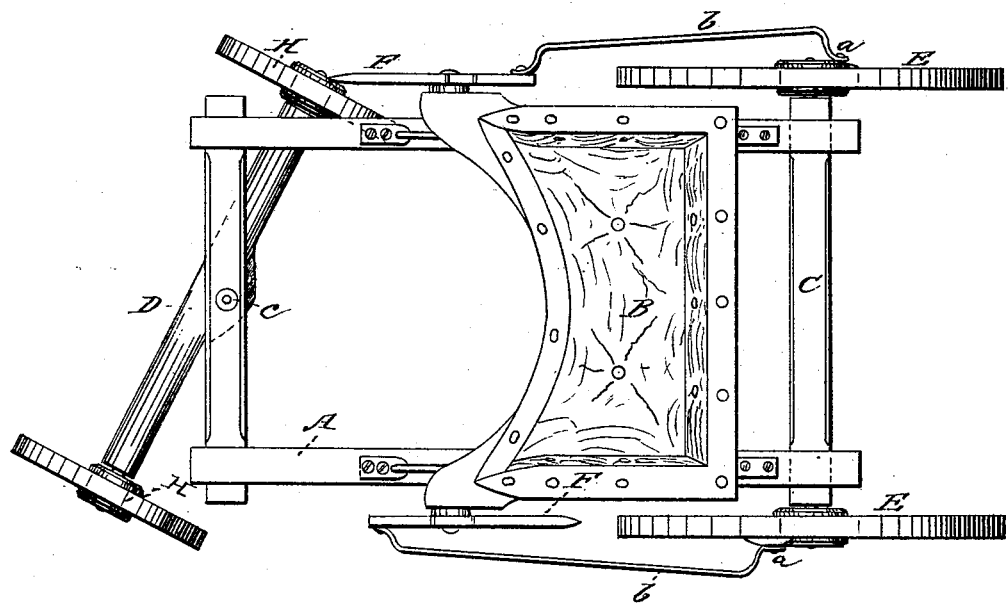
Figure 2 is a plan or top view of the same.

This invention relates to a four-wheel propeller, arranged in such a manner that the two front wheels will run underneath the frame-work, thereby enabling the rider to turn short curves with perfect safety. The front wheels are turned and the propeller is steered by the direct action of the feet on the front axle.

In the drawing, the letter A designates the frame, which forms the support for the rider's seat, B, and the connection between the hind axle C and the front axle D of a four-wheeled propeller.

The hind axle, C, is rigidly connected to said frame, and forms the bearings for the hind wheels E, which connect, by eccentric wrist-pins $a$ and pitman-rods $b$, with the hand-levers F, while the front axle is connected to the frame A, by means of a bolster, G, and king-bolt $c$, so that said front axle can be freely turned in either direction.

On the ends of the front axles are mounted the front wheels H, and the bolster G is made of such a height, that said front wheels will run underneath the frame A, and that the front axle can be turned freely in either direction to any desired angle with the centre line of the frame A.

The seat B is in such a position that the rider occupying the same can place his or her feet on the front axle, while he or she propels the device by the action of the hand-levers F, and by turning the front axle in the required direction the machine is steered.

By arranging the front wheels so that they run underneath the frame A, the rider is enabled to turn a short curve without danger, while ordinary four-wheel propellers can only be turned on large curves, since their front wheels do not run under, and consequently can be turned only a short distance in either direction, and if the machine is propelled rapidly, and the front wheels are incautiously turned toward one side or the other, one of said wheels is liable to strike the frame, and the propeller is liable to be upset.

On my propeller, even an unpracticed rider is enabled to go up and down hill, and to turn sharp curves, or go round in a circle no larger than the propeller itself, without the least danger of upsetting.

The steering of my propeller is effected by placing the feet directly on the front axle, so that no extra provision has to be made for this purpose.

My propeller is very cheap in its construction, and it can be readily packed in its own body, requiring no extra space, a very desirable item for shipping.

What I claim as new, and desire to secure by Letters Patent, is—

The open frame A, elevated above the front wheels to clear the same, through the medium of the bolster G, the parts being so constructed and arranged as to allow the rider's feet to protrude through the frame and rest directly on the axle, and the front wheels to turn under the said frame, as and for the purpose herein described.

R. G. ELDER.

Witnesses:
W. HAUFF,
C. WAHLERS.